United States Patent Office 3,398,973
Patented Aug. 27, 1968

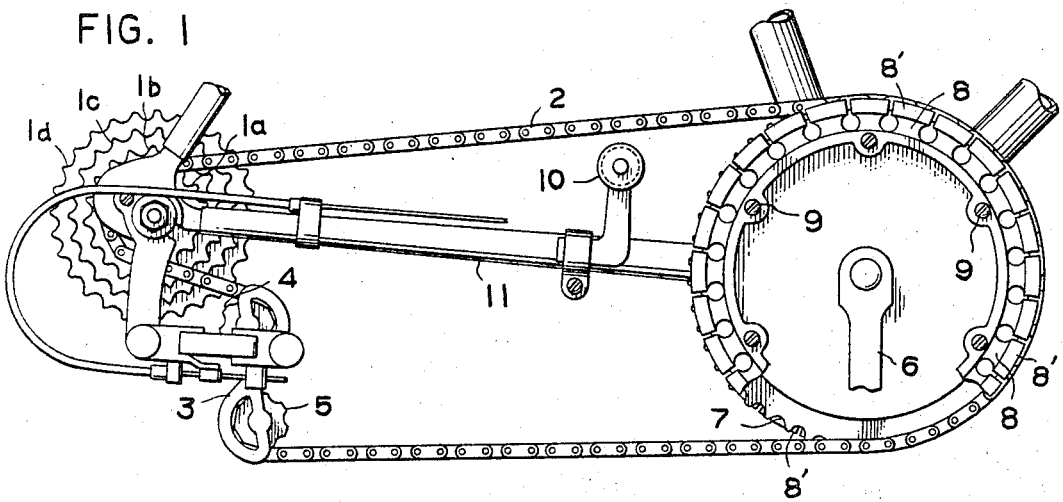
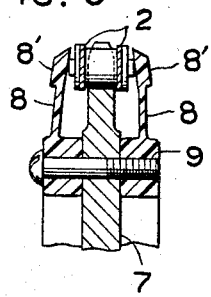
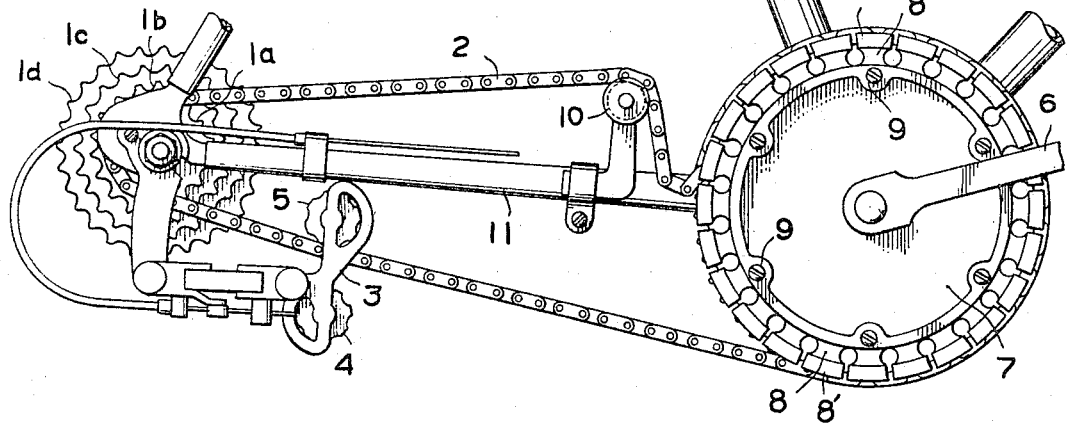

3,398,973
DRIVING CHAIN TENSIONING DEVICE IN A BICYCLE EQUIPPED WITH COASTER BRAKE AND EXPOSED SPEED CHANGE MECHANISM
Keizo Shimano and Masashi Nagano, Sakai, Japan, assignors to Shimano Kogyo Kabushiki Kaisha, Sakai, Japan
Filed June 8, 1967, Ser. No. 644,550
Claims priority, application Japan, June 15, 1966, 41/56,903
1 Claim. (Cl. 280—236)

ABSTRACT OF THE DISCLOSURE

This invention relates to a driving chain tensioning device in a bicycle equipped with a coaster brake adapted to be put into operation when the front sprocket is rotated in the reverse direction for applying the coaster brake.

---

Primary object of the present invention is to provide an improved device for holding the upper run of the driving chain under tensioned condition when the front sprocket is rotated in the reverse direction, preventing any tendency of the driving chain from being disengaged from the front sprocket teeth upon applying the coaster brake.

Other objects of the present invention will become apparent from the following detailed description taken in conjunction with the accompanying drawings, wherein:

FIGURE 1 is a side view of the chain tensioning device forming an embodiment of the present invention in the position when the bicycle is running in the normal direction;

FIGURE 2 is a similar view of the device according to this invention shown in the position when the coaster brake is applied by rotating the front sprocket in the reverse direction; and FIGURE 3 is a detail in radial section of the resilient members for preventing detaching of the driving chain from the front sprocket.

Coaster brake for a bicycle is usually built in the rear hub and, in the embodiment of the present invention shown in FIGS. 1 and 2, the speed change gear comprises a plurality of sprocket wheels 1a, 1b, 1c and 1d of different number of teeth mounted in order on the right-hand end portion of the rear hub, the smallest sprocket wheel 1a being disposed at the outermost position. Adjacent said multistage sprocket wheel assembly, there is provided a change-over lever 3 having a guide sprocket wheel 4 and a tensioning sprocket wheel 5, and the lower run of the driving chain 2 is ordinarily wound around said sprocket wheels 4 and 5 forming an S-shaped path as shown in FIG. 2, so that the lower run of the driving chain 2 is maintained in tensioned condition when the front sprocket 7 is rotating in the normal direction as shown in FIG. 1. The arrangement of the above mentioned parts of the device is old in this type of the conventional bicycle equipped with coaster brake and the exposed speed-change mechanism. In such conventional speed-change mechanism with the coaster brake which is applied by rotating the front sprocket in the reverse direction, the upper run of the driving chain is liable to be slackened when the coaster brake is applied by rotating the front sprocket in the reverse direction.

According to the present invention, one of the objects of which is to prevent detaching of the upper run of the driving chain 2 when the front sprocket 7 is rotated in the reverse direction, there is provided a pair of protecting rings 8 made of resilient material such as nylon secured along the rim of the front sprocket 7 having a pedal crank 6, as shown. The outer portions 8' of the rings 8 are arranged near the opposite sides of the sprocket teeth, and its inner portions are arranged vis-a-vis and securely mounted on the rim of the front sprocket 7 by means of screw bolts 9, 9.

10 is a chain supporter having a roller disposed at the position just beneath the straight path of the upper run of the driving chain 2 running in the normal direction, and disposed rearwardly of the front sprocket 7. The lower end of the chain supporter 10 is fixed to a chain stay 11.

When the bicycle is running in the normal direction, the lower run of the driving chain 2 takes an S-shaped path around the guide and tension sprocket wheels of the change-over lever 3 and is maintained in tensioned condition as shown in FIG. 1, the chain 2 being prevented from being sidewardly detached from the front sprocket teeth. Now, when the front sprocket 7 is rotated in the reverse direction in order to apply the coaster brake, the lower run of the chain 2 will be pulled forwardly, rocking the change-over lever 3, and will be straightened. On the other hand, the upper run of the chain 2 will be slackened and bent downwardly, but it will be kept tensioned by means of the chain supporter 10 at the position near the front sprocket as shown in FIG. 2, the chain being prevented from being disengaged from the sprocket teeth by means of the protecting rings 8. Preferably, each of the protecting rings 8 is provided with a plurality of radial slits with the continuous circumferential inner portion, as shown, in order to obtain better resiliency thereof.

From the foregoing it will be seen that, according to the present invention, when the coaster brake is applied by rotation of the front sprocket 7 in the reverse direction, followed by slackening of the upper run of the driving chain 2, the upper run of the chain 2 forming a downwardly bent depending portion will be supported by the chain supporter 10, so that the chain is kept in tensioned condition, and moreover any tendency of the chain being disengaged from the sprocket teeth is prevented by the protecting rings 8. Thus, any drawback derived from the dual provision of the coaster brake plus the exposed speed-change mechanism may be overcome.

What we claim is:
1. In a bicycle, the combination of a rear hub having a coaster brake and equipped with exposed speed-change mechanism of the type composed of a plurality of sprocket wheels of different number of teeth mounted on said rear hub and a change-over lever for selecting any one of said plurality of sprocket wheels for chain drive, a driving chain tensioning device comprising a front sprocket, which when turned in the reverse direction applies the coaster brake through a pair of protecting rings secured to the rim of said front sprocket and arranged vis-a-vis holding therebetween a driving chain that is in engagement with the sprocket teeth, and a chain supporter for supporting the upper run of the driving chain at the position to the rear of the said front sprocket.

References Cited
UNITED STATES PATENTS
2,718,108    9/1955    Schmidt _____ 74—242.8

FRED C. MATTERN, Jr., *Primary Examiner.*
J. A. WONG, *Assistant Examiner.*